Feb. 27, 1934.                W. FISCHER                1,948,704
METHOD OF OPERATING HIGH FREQUENCY FURNACES
Filed Nov. 20, 1926            3 Sheets-Sheet 1

Inventor
Wilhelm Fischer
per 
Attorney

Feb. 27, 1934.    W. FISCHER    1,948,704
METHOD OF OPERATING HIGH FREQUENCY FURNACES
Filed Nov. 20, 1926    3 Sheets-Sheet 2

Inventor
Wilhelm Fischer
per [signature]
Attorney

Inventor
Wilhelm Fischer
per
Attorney

Patented Feb. 27, 1934

1,948,704

UNITED STATES PATENT OFFICE 1,948,704

METHOD OF OPERATING HIGH FREQUENCY FURNACES

Wilhelm Fischer, Berlin-Tempelhof, Germany, assignor to C. Lorenz Aktiengesellschaft, Berlin-Tempelhof, Germany Application November 20, 1926, Serial No. 149,750
In Germany January 30, 1926

11 Claims. (Cl. 172—246)

This invention is directed to improvements in methods of operating high frequency furnaces, for instance melting furnaces and the like, in which during their operation the inductivity as well as the ohmic resistance of the load is subjected to changes, as is the case, for instance, to a pronounced degree in the melting of iron, where the magnetic permeability and the electric conductivity show different values before and after the melting.

For obtaining the best possible working effect in such machines, it is customary now to attune such consumers to resonance with the machine frequency, that is to say $\cos \phi = 1$.

For each machine there obtains an optimum relation (ratio) of inner loss resistance to the ohmic load resistance, which, for obtaining the highest output, is generally made $=1$.

For obtaining the most favorable working effect, which, as is well known, need not always coincide with the highest output, it may be found best to alter this relation (ratio). If there obtains a certain load, the resistance of which does not correspond to this desired relation, the load resistance may be placed in a secondary circuit, and the coupling ratio so chosen, that the generator is loaded again in the desired manner. The resulting optimum dimensioning of the consumer arrangement, that is to say, the proper selection of the ratio with regard to the ohmic load resistance and proper selection of the self-inductivities and capacities for obtaining resonance ($\cos \phi = 1$), will, however, be considerably disturbed, if the load resistance itself changes. In such case by reason of detuning the supply of energy of the generator is impeded and the working efficiency of the organization decreased. This means that the melting process is unduly extended and under certain circumstances the output is injuriously affected, for instance in the heat treatment of springs and the like.

In order to obviate these drawbacks and to feed to the work always the same amount of energy from the generator, for the purpose of obtaining the best possible working efficiency, and at the same time shortening the operating time period, I so coordinate the ratios of the coupling as well as the blind resistance and that of the changeable value of the load resistance that always the desired optimum load is maintained.

The invention may be better characterized by stating that the impedance (i. e., the alternating current resistance of the load circuit in which the furnace is arranged) is controlled so as to remain continuously unchanged, whereby, as a result of keeping the impedance strictly constant, steady loading of the generator is possible. Every generator will produce the best results only at a certain strength of current, tension and phase-displacement between current and tension. The load circuit is, therefore, controlled accordingly and without consideration of the resistance of the high frequency furnace. As this resistance changes, it is necessary to employ means in the load circuit for keeping its impedance continuously unchanged, and to employ also means to keep the phase and magnitude of the generator current always constant so as to secure a most favorable transformaton of the generator upon the load circuit, thus securing maximum efficiency of operation and preventing undue expense of operation which must be kept as low as possible in high frequency apparatus of this character.

Figs. 11a to 12d, inclusive, show diagrams of circuits which I regard as of the most practicable working type for carrying my invention into practice.

Any device, which consumes high frequency, may have a certain ohmic resistance $r$. The effective input is $i^2 r$, if $i$ is the current input. The voltage required for this current at the terminals of such a device is $U = ir$. The consuming circuit in the majority of cases contains besides the resistance $r$ an inductance L or a capacity C. The terminal voltage, therefore, is to be higher in proportion to the impedance of the consuming circuit, that is, $$U = i\sqrt{r^2 + (\omega L)^2}$$

and $$U = i\sqrt{r^2 + \left(\frac{1}{\omega C}\right)^2}$$

respectively, which formulæ are according to

Ohm's law for A. C., which reads as follows:

$$U=i\sqrt{r^2+\left(\omega L-\frac{1}{\omega C}\right)^2}.$$

The first formula here applies to the consumer circuit, containing an ohmic resistance and an inductance, while the second applies to the consumer circuit when besides the ohmic resistance, a capacity is also present. Since the capacity resistance is equal to zero the value $$\frac{1}{\omega C}$$

of the second formula is not present in the first. $\omega$ in these formulæ is equal to $2\pi f$, where $f$ is the frequency. The apparent energy to be delivered by the generator G is therefore considerably larger than the effective energy. The factor $$\cos\phi=\frac{\text{resistance}}{\text{impedance}}$$

thus is considerably smaller than 1. The means well known in alternating current work, to make the power factor $\cos=\phi 1$, consists in compensating an inductive reactance by a capacitive reactance or vice versa, in terms of high frequency technique, by tuning, wherein resonance tuning is defined by the condition $$\omega_0=\frac{1}{\sqrt{CL}}$$

If the consuming circuit is thus tuned, the generator will act as only upon the resistance $r$. The highest efficiency of the entire energy transmission is obtained, when the external resistance $r$ equals the internal resistance $R_i$ of the generator. This condition is not given "a priori" in the above cited case, but may be realized with a given consuming circuit A by properly choosing the generator. If the value of $r$ changes at intervals, an adaption by means of choosing a certain generator can only be effected for a certain time interval. A method to adapt internal and external resistance to each other, well known in alternating current work, is the use of a transformer.

Figure 1:
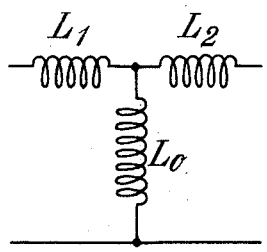
Fig. 1 is an exemplificative view of a type of transformer basically employed.

The well known equivalent for a transformer not free from leakage is shown in Fig. 1, wherein $L_1$ and $L_2$ are the primary and secondary leakage inductances and $L_0$ the inductance which couples the circuit. As a means of coupling any two circuits with inductive and capacitive reactance the general transformer diagram shown in Fig. 2 may serve. (It is then assumed, that there should be no loss in the transformation, that is, no resistance is shown in the common branch.)

Figure 2:
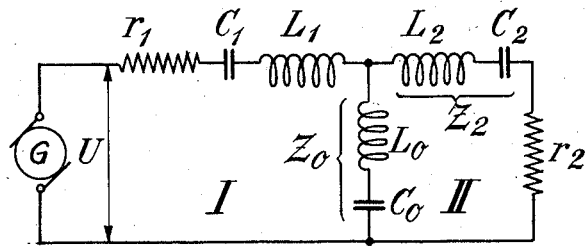
Fig. 2 is a diagram of an energy consuming arrangement embodying my invention.
Figure 3:
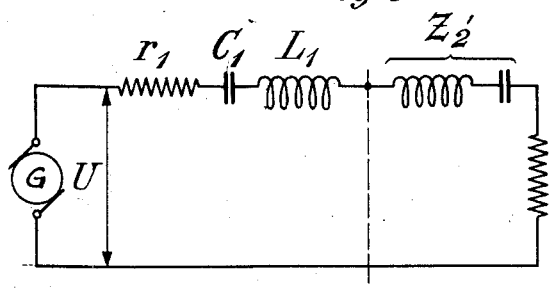
Figs. 3, 4 and 5 are views of other arrangements which may be employed.

The impedance $(r_2+jz_2)$ of the load circuit II is then transformed upon the input circuit I in a certain ratio $a$ so that Fig. 3 may be substituted for circuit Fig. 2, if $r'_2=ar_2$ and $$z'_2=-a(z_2+z_0).$$

Herein is $$z=\omega L-\frac{1}{\omega C}$$

the resulting reactance. The factor $a$ is calculated as $$a=\frac{z_0^2}{r_2^2+(z_0+z_2)^2}.$$

The factor $a$ may be greater or less than 1, according to the selection of $z_0$ in proportion to $(r_2+jz_2)$, the load resistance $r_2$ may therefore be transformed upon the input circuit, that is, it may be adapted to the generator in any ratio.

Instead of the mixed coupling of the two circuits shown in Fig. 2, pure inductive or pure capacitive coupling may be used without changing the principle and the equations of the transformation.

Sometimes load cases enter where the resistance of the consuming circuit varies considerably during a period of operation. If the impedance is complex, reactance tuning alone or a corresponding change of transformation alone is not sufficient to keep constant the load condition $\cos\phi=1$ and external (load) resistance $R_a=$internal (generator) resistance $R_i$ for the generator. Only the combination of the two, namely of the transformation variable in operation, and the tuning variable in operation, in accordance with the invention, permits the fulfillment of this condition.

Figure 4:
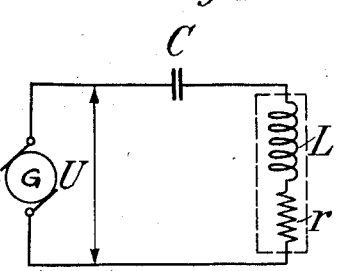
Figure 5:
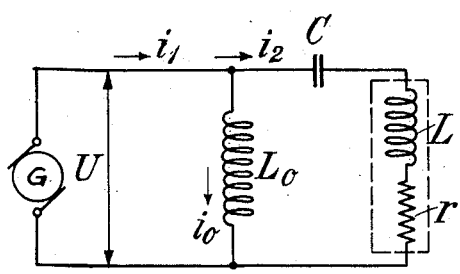
Figure 6:
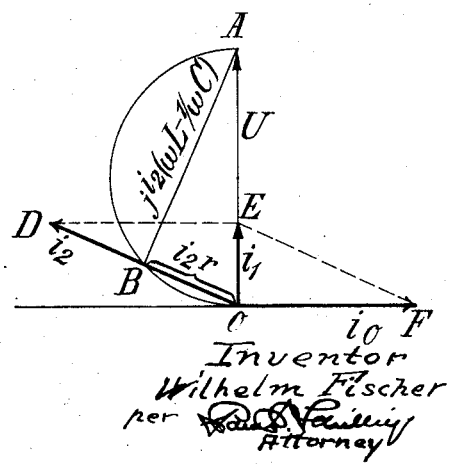
Fig. 6 is a vector diagram relating to the arrangement shown in Fig. 5.
Figure 6:
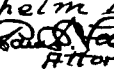

This may be illustrated by an example. A high frequency induction furnace is a consumer of high resulting reactance which may, however, change its value considerably under circumstance during the process of melting. In the same manner, the ohmic resistance of the furnace will change during a period of operation. If the furnace circuit is tuned by condensers connected as in Fig. 4 (series-resonance connection), $\cos\phi$ will equal 1, but not $R_a=R_i$. This may be obtained by a circuit analogous to Fig. 2, for instance, by means of autotransformer coupling (Fig. 5). The vector diagram Fig. 6, pertains to this circuit; $L_0$ is chosen so that $$i_0=OF=DE=\frac{U}{j\omega L_0}.$$

Thereby $i_1$ is in phase with U, that is, $\cos\phi=1$. Furthermore $$R_i=\frac{U}{i_1}=R_a.$$

Figure 7:
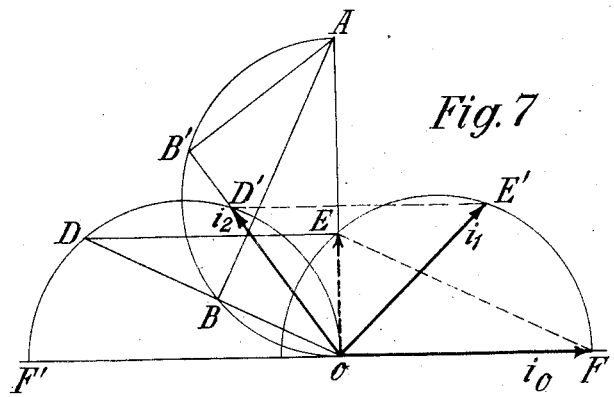
Figs. 7 and 8 are other vector diagrams applying thereto.

If $r$ changes, B (Fig. 7) travels over the circle OBB'A, as U always equals $$i_2\left[r+j\left(\omega L-\frac{1}{\omega C}\right)\right]=OA.$$

By drawing FOF' at right angles to OA and making $OF'=OA$, and by constructing a semi-circle over OF' like the one over OA, OD will equal AB. The stretch $$AB=ji_2\left(\omega L-\frac{1}{\omega C}\right)$$

is proportional to $i_2$; OB is in the direction of $i_2$ according to Fig. 6 ($OB=i_2r$); OD therefore represents $i_2$ in magnitude and direction. Then $DE=OF$ represents $i_0$ and OE represents $i_1$. As B travels over the circle OBB'A, so D travels over the circle F'DD'O and E over EE'F. It will be seen that a change in $r$ brings about a small furnace current $i_2$ ($=OD'$) but also a $\cos\phi<1$, owing to a larger machine current $i_1$ being out of phase with the terminal voltage U (OA).

The latter incident conditions correcting the "tuning" i. e. changing the quantity $$\left(\omega L-\frac{1}{\omega C}\right)$$

Figure 8:
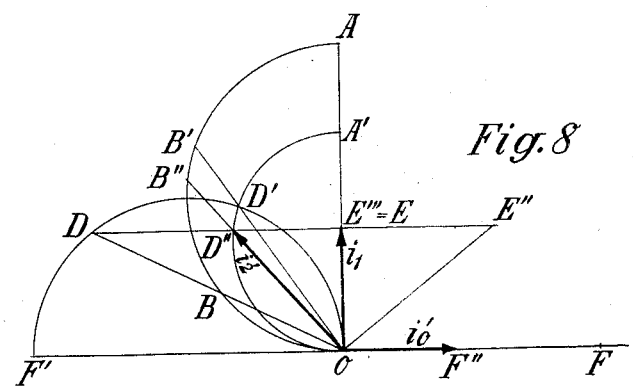

The resulting reactance $$\left(\omega L-\frac{1}{\omega C}\right)$$

is to be increased. Point B' travels therefore over the same circle A B'B''O back to point B'' (Fig. 8). As $r'$ is now constant OB' is proportional to $i_2$; D' therefore travels to D'' over a semicircle passing through O and D', the center of which is located upon OA. D" is the point of intersection of this semicircle and the straight line ED, $i_2$ is now represented by OD".

Adding now, as before the current $i_0 = OF = D''E''$, we obtain $i_1$ the stretch OE''. Also this current is still larger than the original current OE, which had been adapted to the internal resistance of the generator, so as to make $$\frac{U}{i_1} = R_i,$$

besides it is shifted in phase against U. Now, however, the component in the direction of U is equal to OE. It is thus seen that tuning alone will not again restore the original conditions of operation—relative to the generator. If, however, we introduce at the same time the possibility—and this is the gist of the invention—to vary the quantity OF (Fig. 7), as shown for instance in Fig. 5, by a change of reactance $L_0$, that is, by changing the transformation ratio, if we make $i'_0 = OF'' = D''E$, we obtain the generator current as $i_1 = OE$, which was our problem.

The circumstances are quite analogous in the case where the reactance in the transformer circuit varies instead of the resistance, or where both vary simultaneously. Phase and magnitude of the generator current are only kept constant—the latter must be kept constant as it was assumed that $R_i = R_a$, that is, $$i_1 = \frac{U}{R_i} = \text{constant}$$

when at the same time tuning and transformation ration can be changed.

Figure 9:
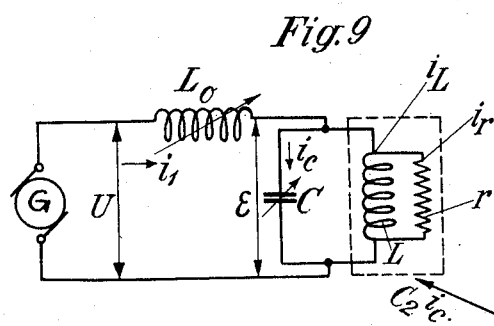
Fig. 9 is a diagram of still another arrangement which may be employed.
Figure 10:
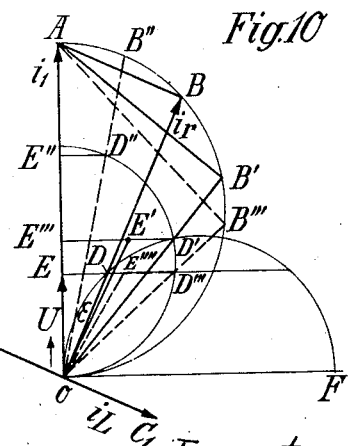
Fig. 10 is a vector diagram pertaining thereto.
Figure 11A:
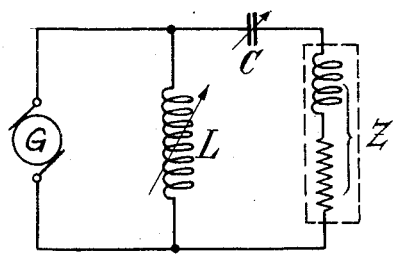
Figure 11B:
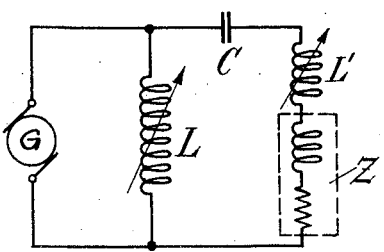
Figure 11C:
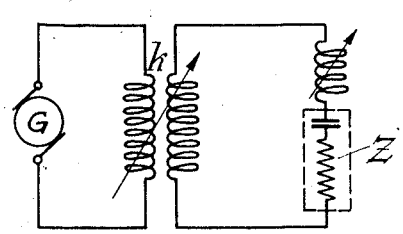
Figure 11D:
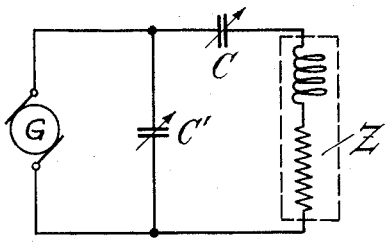
Figure 12A:
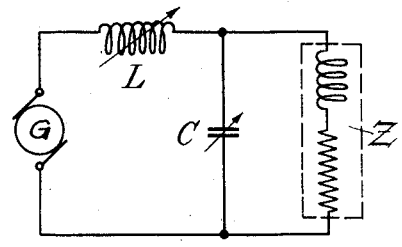
Figure 12B:
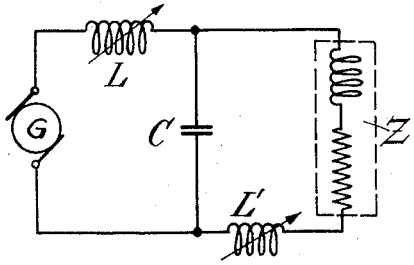
Figure 12C:
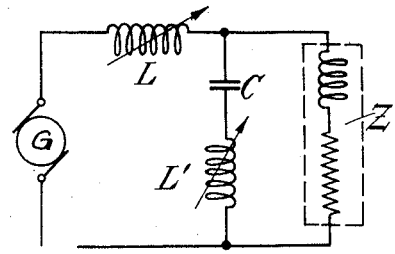
Figure 12D:
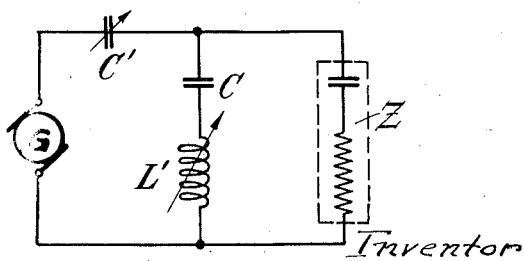

An arrangement reducible to the same principle is presented in Fig. 9, which shows a parallel resonance connection of the load (furnace) resistance to the generator. The vector diagram pertaining thereto is shown in Fig. 10.

Let $OC_1 = i_L$, $OC_2 = i_C$; $OB = i_r$: the geometrical sum is $OA = i_1$. The voltage $\epsilon$ has the direction of OB and may be represented by the length OD. $L_0$ may be chosen such that U, that is the geometrical sum of $\epsilon = OD$ and $Ji_1\omega L_0 = DE$, is in phase with $i_1$. Now if $r$ varies, B travels over the circle ABO to B', if $i_1$ is to remain constant, and correspondingly D over the circle ODF to D'. D aw $D'E' = DE$, then $OE'$ is the terminal voltage U' which would be required to preserve the original current $i_1$; U' is considerably higher then and shifted in phase against the real U. Therefore a retuning is necessary to bring U in phase with $i_1$. This is to be effected by changing C, that is C is to made larger and $i_C$ smaller. Thereby B' would travel to B'' and correspondingly D' to D''. D''E'' being equal to DE would bring $U' = OE'$ in phase with $i_1$, but make it considerably higher than U. Therefore, tuning alone would not bring about the most favorable load condition. Transformation change means change of $L_0$. With respect to D' this means: The pressure $Ji_1\omega L_0$ must be increased by increasing $L_0$ until E' reached E'''. But then U would be still too high, wherefore tuning and transformation have to be combined. Bringing by tuning B' to B''' and thereby D' to D''' and making by transformation the pressure at $L_0 = D''' E$, we obtain $U = OE$ and $i_1 = OA$, as was required. If the load is capacitive (L a capacity), the diagram shows that instead of $L_0$ a variable capacity is to be provided for change of transformation.

These examples show that the two conditions for most advantageous use of a high frequency generator, namely, $\cos\phi = 1$ and $R_a = R_i$ in load cases where the impedance of the consuming circuit varies during the operation, can only be fulfilled without interrupting the operation, when tuning and transformation ratio can be changed simultaneously during the operation as laid down in the invention.

Other circuit possibilities to carry out the process in conformity with the invention are presented in Figs. 11 and 12, which may be combined at will. It is essential, that always two variable quantities are present, the one for tuning and the other for transformation.

Fig. 11 represents examples of execution, wherein the member used for tuning is connected in series with variable impedance of the consuming circuit (so-called series-resonance connection), while Fig. 12 presents examples wherein the member used for retuning is arranged in parallel with the impedance of the consuming circuit, (so-called parallel resonance connection). In Fig. 11 $z$ designates the variable impedance of the consuming circuit, for instance, of a high frequency induction furnace. For retuning in Fig. 11 a variable capacity C is provided, in Fig. 11b a variable inductance L' in series with the tuning capacity C, in Fig. 11c a variable inductance, whereby the assumption is made that the load of the consuming circuit is capacitative ($z$ capacitive), while Fig. 11d, the same as Fig. 11a, provides a variable capacity C. To vary the transformation ratio there is provided an autotransformer coupling by means of the variable inductance L shown in Figs. 11a and 11b; or a pure inductive coupling by means of the variable coupling arrangement K shown in Fig. 11c, or, as in Fig. 11d, a corresponding capacitive coupling is provided by means of a condenser C'. In Fig. 12 $z$ represents again the consuming circuit with variable impedance, which is inductive in Fig. 12a, 12b and 12c, capacitive in Fig. 12d. The tuning member for retuning is a capacity C in Fig. 12a, a variable inductance L' and fixed tuning condenser C in Fig. 12b, 12c and 12d while for the variation of the transformation ratio in the first three cases ($z$ inductive load), a variable inductance L and in the last case ($z$ capacitive load), a variable capacity C' is provided.

What I claim as new and desire to secure by Letters Patent of the United States is as follows:

1. The method of operating a system having a circuit including a high frequency generator to produce a sustained frequency, a load circuit coupled to the generator circuit and including a consuming element subject to variation in impedance during operation, and tuning means to tune said load circuit to the sustained frequency, which comprises varying the tuning means and the coupling to maintain the load circuit substantially resonant to the sustained frequency and to control the magnitude of energy delivered by the generator to the load circuit as the impedance of said element varies.

2. The method of operating a system having current supplying means for high frequency melting furnaces, a high frequency alternator machine, a load impedance, a circuit including said impedance, said circuit having a natural frequency substantially resonant with the machine frequency, tuning means in said circuit in series with the load impedance, and tuning means in said circuit in parallel with the load impedance and the means for tuning the load impedance, and variably connected with the terminals of the alternator machine, which consists in varying both said tuning means during operation to maintain the circuit including the load impedance substantially resonant with the machine frequency and to maintain the external resistance of the alternator machine substantially equal to its internal resistance.

3. The method of operating a system having current supplying means for high frequency melting furnaces, a high frequency alternator machine, a heating coil, a circuit including said coil, said circuit having a natural frequency substantially resonant with the machine frequency, tuning means in said circuit in series with the heating coil, and tuning means in said circuit in parallel with the coil and said first-mentioned tuning means, and variably connected with the terminals of the alternator machine, which consists in varying both said tuning means during operation to maintain the heating coil circuit substantially resonant with the machine frequency and to maintain the external resistance of the alternator machine substantially equal to its internal resistance.

4. The method of operating a system having current supplying means for high frequency melting furnaces, a high frequency alternator machine, a load impedance, a circuit including said impedance, said circuit having a natural frequency substantially resonant with the machine frequency, tuning means in said circuit in series with the load impedance, and a variable inductance in said circuit in parallel with the load impedance and connected with the terminals of the alternator machine, which consists in varying said tuning means during operation to maintain the circuit including the load impedance substantially resonant to the machine frequency and varying said inductance to maintain the external resistance of the alternator machine substantially equal to its internal resistance.

5. The method of operating a system having a high frequency feed circuit for high frequency melting furnaces, a high frequency dynamo machine, a heating coil to be supplied by said machine, a circuit substantially resonant to the machine frequency and containing said heating coil, tuning means in said circuit, and coupling means between said circuit and the dynamo machine, said means being in parallel with said circuit and connected to the terminals of the dynamo machine, which consists in varying said tuning means during operation to maintain said heating coil circuit substantially resonant with the machine frequency and varying said coupling during operation to maintain the external resistance of the dynamo substantially equal to its internal resistance.

6. The method of operating a system having a circuit including a high frequency dynamo machine, a load impedance to be supplied by said machine, a second circuit substantially resonant to the frequency of the machine and containing said load impedance, variable tuning means in said second circuit, and variable coupling means between said dynamo machine circuit and said load impedance circuit, which consists in varying said tuning means during operation to maintain the load impedance circuit substantially resonant with the machine frequency and varying said coupling means during operation to maintain the external resistance of the dynamo substantially equal to its internal resistance.

7. The method of operating a system having a high frequency feed circuit for high frequency melting furnaces, a high frequency dynamo machine, a heating coil to be supplied by said machine, a circuit substantially resonant to the machine frequency and containing said heating coil, tuning means in series in said circuit, an inductance shunted across said circuit, and means for variably connecting said inductance to the terminals of the dynamo machine, which consists in varying said tuning means during operation to maintain the heating coil circuit substantially resonant with the machine frequency and varying the connection to said inductance during operation to maintain the external resistance of the dynamo substantially equal to its internal resistance.

8. The method of operating a system having a high frequency feed circuit for high frequency melting furnaces, a high frequency dynamo machine, a heating coil to be supplied by said machine, a circuit substantially resonant to the machine frequency and containing said heating coil, variable tuning means in said circuit and in series with said coils, and a variable parallel coupling between said circuit and said dynamo machine, which consists in varying said tuning means during operation to maintain said heating coil circuit substantially resonant with the machine frequency and varying said coupling during operation to maintain the external resistance of the generator substantially equal to its internal resistance.

9. The method of operating a high frequency furnace having a high frequency generator, a variable inductance and a variable condenser connected thereto in series, and a load impedance connected in parallel with said condenser, which consists in varying said inductance and condenser during operation to maintain the circuit including the load impedance substantially resonant with the generated frequency, and to maintain the external resistance of the generator substantially equal to its internal resistance.

10. The method of operating a high frequency furnace having a high frequency generator, a variable inductance and a condenser connected thereto in series, and a variable inductance and load impedance in series connected in parallel with said condenser, which consists in varying said inductances during operation to maintain the circuit including the load impedance substantially resonant with the generated frequency and to maintain the external resistance of the generator substantially equal to its internal resistance.

11. The method of operating a high frequency furnace having a high frequency generator, a load impedance, means for tuning the load impedance to the generated frequency, and means for variably coupling the generator to the load impedance, which comprises varying the tuning means and the coupling during operation to maintain the load circuit substantially resonant to the generated frequency and to control the magnitude of energy delivered by the generator to the load circuit.

WILHELM FISCHER.